United States Patent
Skowronek et al.

(10) Patent No.: US 10,740,768 B2
(45) Date of Patent: Aug. 11, 2020

(54) CUSTOMER LOYALTY PROGRAM WITH SHARED DATA AND SUB-PROGRAMS

(71) Applicant: First Data Corporation, Greenwood Village, CO (US)

(72) Inventors: Dan Skowronek, Parker, CO (US); Sunil Dewan, Centennial, CO (US); Kevin Knowles, Highlands Ranch, CO (US); Stuart Kiefer, Parker, CO (US)

(73) Assignee: First Data Corporation, Greenwood Village, CO (US)

( * ) Notice: Subject to any disclaimer, the term of this patent is extended or adjusted under 35 U.S.C. 154(b) by 378 days.

(21) Appl. No.: 15/729,454

(22) Filed: Oct. 10, 2017

(65) Prior Publication Data

US 2018/0137518 A1    May 17, 2018

Related U.S. Application Data

(63) Continuation of application No. 12/052,962, filed on Mar. 21, 2008, now abandoned.

(51) Int. Cl.
*G06Q 30/00* (2012.01)
*G06Q 30/02* (2012.01)

(52) U.S. Cl.
CPC ......... *G06Q 30/02* (2013.01); *G06Q 30/0226* (2013.01)

(58) Field of Classification Search
None
See application file for complete search history.

(56) References Cited

U.S. PATENT DOCUMENTS

| | | | |
|---|---|---|---|
| 2005/0267800 A1 | 12/2005 | Tietzen et al. | |
| 2006/0074755 A1* | 4/2006 | Juetten | G06Q 30/02 705/14.32 |
| 2006/0259362 A1* | 11/2006 | Cates | G06Q 30/02 705/14.17 |
| 2007/0005416 A1 | 1/2007 | Jackson et al. | |
| 2008/0176655 A1 | 7/2008 | James et al. | |

OTHER PUBLICATIONS

International Search Report and Written Opinion dated May 12, 2009 for PCT/US2009/036496; all pages.

* cited by examiner

*Primary Examiner* — Alvin L Brown
(74) *Attorney, Agent, or Firm* — Kilpatrick Townsend & Stockton LLP

(57) ABSTRACT

Embodiments of the present disclosure provide systems and methods for increasing participation in loyalty programs. In embodiments, the customer opts into a loyalty program. The customer is then provided with information about his or her loyalty participation and also is provided with information about one or more other customer's participation in the loyalty program. In another embodiment, one or more loyalty members can form their own competition or group within the loyalty program. The members can create loyalty sub-program rules for a competition and allow fellow loyalty members to participate in the competition. The customizable loyalty sub-program competitions further enhance member participation.

30 Claims, 9 Drawing Sheets

CUSTOMER LOYALTY PROGRAM WITH SHARED DATA AND SUB-PROGRAMS

CROSS REFERENCE TO RELATED APPLICATION

This application is a continuation of U.S. patent application Ser. No. 12/052,962, filed Mar. 21, 2008, entitled "CUSTOMER LOYALTY PROGRAM WITH SHARED DATA AND SUB-PROGRAMS," the entire disclosure of which is incorporated herein by reference for all purposes.

BACKGROUND OF THE INVENTION

Embodiments of the disclosure generally relate to customer loyalty programs and, more specifically, but not by way of limitation, to maintaining and/or increasing member activity and participation in loyalty programs.

A loyalty program gives benefits or incentives to a customer that consistently buys at the store or consistently buys the organization's products. For example, if a customer buys the same product nine times, the retailer gives the customer the tenth product for free. The loyalty programs offer the organization information about customer buying habits, demographics, or other information. However, if the customer fails to participate in the loyalty program, this information is not gathered, the customer does not get the benefits of being a member, and the sponsoring organization does not benefit from increasing the member's purchase behavior.

Generally, a customer provides information during a transaction that identifies the customer as a member of a loyalty program. The transaction information is then used by a loyalty program to accrue purchase activity, award points or otherwise determine how the transaction benefited the customer in the loyalty program. After the customer reaches a pre-defined threshold, the organization gives the customer some reward. Generally, customers must remember to identify themselves as part of the loyalty program. Also, organizations generally provide communication about the program to the customer on a limited basis, which does not keep the loyalty program at the front of the customer's mind while purchasing.

It is in view of these and other considerations not mentioned herein that the embodiments of the present disclosure were envisioned.

BRIEF SUMMARY OF THE INVENTION

Embodiments of the present disclosure provide systems and methods for increasing member participation in loyalty programs. In embodiments, the customer opts into a loyalty program. The loyalty program can be within one retailer or can include purchase behaviors across multiple retailers. The customer is then provided with information about his or her loyalty program participation and also is provided with information about one or more other customers in the loyalty program. With the information about other loyalty program participants, the organization or customer can organize competitions or other contests between the loyalty program participants. The element of competition induces increased loyalty member participation.

In another embodiment, one or more loyalty members can form their own competition or group within the loyalty member pool. The member can create rules for a competition and allow fellow loyalty members to participate in the competition. The customizable loyalty program competitions further enhance member participation.

This Summary is provided to describe one or more embodiments of the present disclosure. The Summary is not meant to limit the claims in any manner or form. The present invention is as embodied in the claims.

BRIEF DESCRIPTION OF THE DRAWINGS

The embodiments of the present disclosure are described in conjunction with the appended figures:

FIG. 4 is a flow diagram of an embodiment of a method for creating loyalty program competitions;

Figure 1:
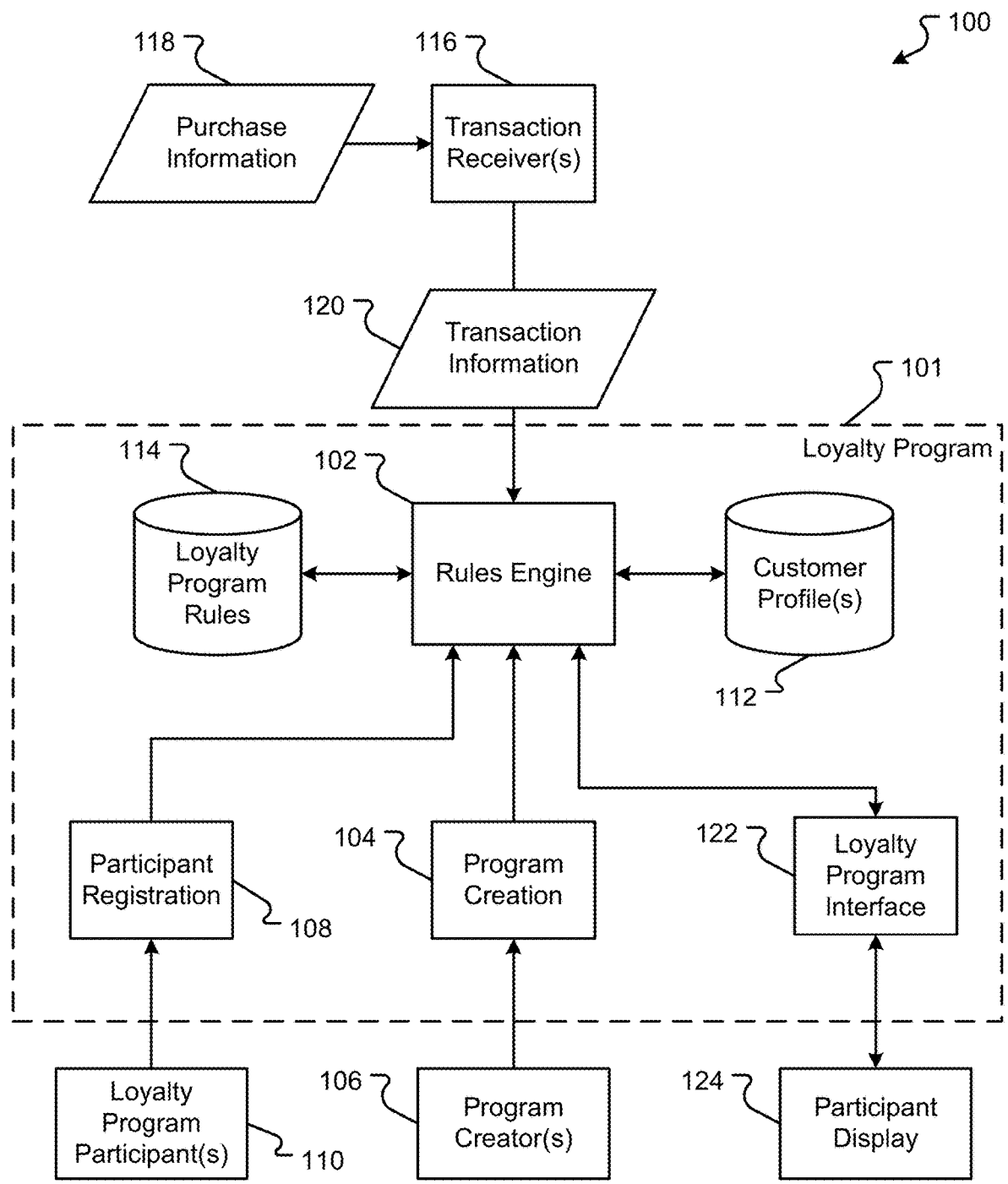
FIG. 1 is a block diagram of an embodiment of a system for managing a loyalty program that allows loyalty competition or insight into participation by two or more loyalty members.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides exemplary embodiment(s) only and is not intended to limit the scope, applicability or configuration of the possible embodiments. Rather, the ensuing description of the exemplary embodiment(s) will provide those skilled in the art with an enabling description for implementing an exemplary embodiment. It being understood that various changes may be made in the function and arrangement of elements without departing from the spirit and scope of the possible embodiments as set forth in the appended claims.

Embodiments of the present disclosure provide unique and novel systems and methods for managing loyalty programs. The embodiments include a system that provides loyalty program participants information about one or more other participants in the loyalty program. In further embodiments, the system provides the ability to create competitions or groups within the loyalty program. A loyalty program, in embodiments, is a program that provides a reward (for example, points, discounts, exclusive access, preferred treatment, etc.) in response to some desired behavior (for example, a predetermined number of visits, a predetermined of money spent, buying a particular product or service, etc.).

An example of an embodiment includes a loyalty program for a retailer, such as McDonalds®. McDonalds® provides a loyalty card to the participants in the company's loyalty program. As the customer is in the process of purchasing and/or paying for a meal, the customer can provide a store salesperson with a token of his or her participation in the McDonalds loyalty program, for example, by presenting a loyalty card. The customer receives points for each qualifying transaction according to the participation rules and offers of the loyalty program. Upon reaching a threshold for loyalty points, McDonalds® provides the customer with a reward, such as a free meal. Therefore, the loyalty program motivates customers to continue to purchase meals at McDonalds®.

However, the customer, in the example above, has no insight into the participation of the other customers of McDonalds®. As an example, an embodiment of the present disclosure provides a computer website where the customer can login and view his or her account for the loyalty program. In addition, the customer can view at least some information for one or more other loyalty program participants. For example, the McDonalds® website may show a list of loyalty program participants ranked in the order of most loyalty program points. The customer can then determine his or her rank for loyalty program points. This information produces a competitive motivation that keeps the loyalty program more in the customer's mind.

In a further example, one customer can create his or her own competition. For example, the customer can create a competition within the larger loyalty program. Participation by others in the competition can be either by open enrollment or by invitation from the individual creating the competition. An example of a specific competition may be which customer can eat the most Big Macs® in a single month. After establishing the rules of the competition, the competition can be open for entry by one or more other loyalty program participants. The loyalty program can show ongoing results for the competition on the website. This customized loyalty program creates an even further competition motivation.

An embodiment for a system 100 for managing a loyalty program 101 providing information about one or more other loyalty program participants 110 is shown in FIG. 1. The components or elements of the system 100 may be hardware, software, or a combination of hardware or software. The components may be collocated in the same facility or distributed at two or more physical locations. One skilled in the art will recognize the different arrangements of the various components that are possible. The components may be in communications with each other, which may include connection by a local area network (LAN), a wide area network (WAN), a wireless LAN, a wireless WAN, a different network, the Internet, or by other type or form of connection.

In embodiments, the system 100 comprises a loyalty program system 101. The loyalty program system 101, in embodiments, is a software program executing on a server for managing the loyalty program 101. The loyalty program system 101 can include a loyalty program rules engine 102, a participant registration component 108, a program creation component 104, a loyalty program interface component 122, a loyalty program rules database 114, and/or a customer profile database 112. In embodiments, the rules engine 102 is in communication with each of the other components of the loyalty program system 101.

The participant registration component 108, in embodiments, is a software and/or hardware system that interfaces with the loyalty program participants 110. The participant registration component 108 communicates with the loyalty program participants 110 to receive information about the loyalty program participants 110. For example, the participant registration component 108 receives personal information, such as the loyalty program participant's name, address, phone number, etc. The information may be communicated to the participant registration component 108 over a network, for example, the Internet. In embodiments, the participant registration component 108 also sends the loyalty program participants 110 information over the network. For example, the participant registration component 108 sends the loyalty program participants 110 their loyalty program identification number or other information needed to identify the customer in the loyalty program 101. The participant registration component 108 can send the information received from the loyalty program participants 110 to the rules engine 102 to be stored in the customer profile database 112. In embodiments, the participant registration component 108 also receives an election of a loyalty program 101 by the one or more loyalty program participants 110.

The program creation component 104, in embodiments, is a software and/or hardware system that interfaces with the program creators 106. The program creation component 104 communicates with the program creators 106 to receive information about the loyalty program 101. For example, the program creation component 104 receives information from a retailer about how points are attributed to predetermined purchases associated with the loyalty program 101. In other embodiments, the program creator 106 is a loyalty program participant 110 that creates a sub-program within an existing loyalty program 101. For example, a customer can create a loyalty contest to determine who eats the most regular McDonalds® hamburgers in a month. This contest may exist within the McDonalds® loyalty program. The information may be communicated to the program creation component 104 over a network, for example, the Internet. In embodiments, the program creation component 104 also sends the program creators 106 information over the network. For example, the program creation component 104 sends the program creators 106 information about how to login to the specialized loyalty contest. The program creation component 104 can send the information received from the program creators 106 to the rules engine 102 to be stored in the loyalty program rules.

In embodiments, the customer loyalty sub-program can be approved or denied by the loyalty program administer or manager. For example, if McDonalds® believes the sub-program is harmful to their customers, the loyalty program administer prevents the sub-program from being instituted. In embodiments, the loyalty program administer receives an alert from the program creation component 104 on a computer interface. The alert can warn the loyalty program administer that a new sub-program has been created. The program creation component 104 sends the rules for the sub-program to the computer interface. The loyalty program administer can then approve or deny the sub-program by selecting a user interface device on the computer interface. If the sub-program is denied, the program creation component 104 can send a message to the program creator 106. In embodiments, the program creation component 104 allows the program creator 106 change the rule(s) that were objectionable and resubmit the sub-program.

Upon creation of a loyalty program 101 and the election of participating in one or more loyalty programs 101 by the loyalty program participants 110, the loyalty program 101 can provide information about the loyalty program 101 to the participants through the loyalty program interface 122. The loyalty program interface 122 is the hardware and/or software that provides an interface for the participant on the participant's display 124. In embodiments, the participant's display 124 is a computer communicating to the loyalty program 101 over the Internet. The loyalty program interface 122 creates web pages that are sent and rendered on the participant's display 124. In embodiments, the loyalty program interface 122 also receives communication from the participant display 124. For example, the participant sends a communication, such as an email, text message, etc., to another participant through the loyalty program interface 122. In embodiments, the loyalty program interface 122 receives the information from the participant's display 124 and forwards the information to the rules engine 102.

The rules engine 102, in embodiments, receives transaction information 120. Transaction information 120 can include any information required to determine or assess loyalty points. For example, the transaction information 12— may include only an amount spent, wherein one or more loyalty points is assessed for each dollar spent, or may include an amount of value different from a monetary amount, i.e., airline miles flown. In other examples, the transaction information 120 includes more detailed transaction information, such as the products purchased, date of purchase, time of purchase, amount spent for each product, etc. The transaction information 120, in embodiments, is sent from one or more transaction receivers 116.

The transaction receiver 116 is the entity or system that receives purchase information 118, organizes the purchase information 118, and sends it as transaction information 120 to the loyalty program 101. In embodiments, the transaction receiver 116 is a point-of-sale device that completes a transaction with a loyalty program participant 110. A salesperson accepts information from the customer that identifies the customer as a loyalty program participant 110. The identification and the other purchase information 118 are forwarded to a retailer or other organization. The retailer forwards the transaction information 120, which may include purchase information 118 from two or more customers, to the rules engine 102.

The rules engine 102, in embodiments, is the component that receives the transaction information 120, accesses the loyalty program rules 114 and the customer profiles 112 to award loyalty points. In embodiments, the rules engine 102 stores participant information in the customer profile database 112, stores loyalty program information in the loyalty program rules 114, and accesses the customer profile database 112 and/or the loyalty program rules 114 to award loyalty points. The rules engine 102 may be hardware and/or software operable to execute the tasks described herein.

In operation, a program creator 106, for example, retailer or other entity, creates a loyalty program 101 by providing loyalty information to the program creation interface 104. This information may include the rules required to be evaluated by the rules engine 102. For example, 10 loyalty points are assigned for the purchase of product X. The program creation interface 104 forwards the rules to the rules engine 102. The rules engine 102 stores the rules in the loyalty program rules database 114. Further description of the loyalty rules database 114 is provided in conjunction with FIG. 5A. A loyalty program participant 110 then registers for the loyalty program 101. For example, the loyalty program participant 110 uses a loyalty participant identifier (e.g., a loyalty program participant number), which is described in conjunction with FIG. 5B, to login to a loyalty program website provided by the participant registration component 108. The loyalty program participant 110 provides information about himself or herself In embodiments, the participant registration component 108 also provides one or more loyalty programs 101 that the loyalty program participant 110 may select in which to participate. The participant's identity, identifier, and selections of loyalty programs 101 may be sent to the rules engine 102. The rules engine 102 can store the information in the customer profile database 112. Further description of the customer profile database 112 is provided in conjunction with FIG. 5B.

After creation of the loyalty program 101 and selection of the loyalty program 101 by one or more loyalty program participant 110, the transaction receiver 116 interfaces with the customer and receives purchase information 118. In embodiments, the purchase information 118 includes the loyalty program identifier for a loyalty program participant 110. The transaction receiver 116 forwards the purchase information 118 and any other required information, as transaction information 120, to the rules engine 102. The rules engine 102 receives the transaction information 120. Upon receiving the transaction information 120, the rules engine 102 may determine if the transaction information 120 pertains to a loyalty program 101 and/or to a loyalty program participant 110. In embodiments, the rules engine 102 extracts the identifier from the transaction information 120 and searches for the identifier in the customer profile database 112. If the identifier for the loyalty program participant 110 is located in the customer profile database 112, the rules engine 102 determines which loyalty programs 101 the customer has selected. After determining the associated loyalty programs 101, the rules engine 102 can search for the loyalty program rules in the loyalty program rules database 114.

The loyalty program rules in the loyalty program rules database 114, in embodiments, provide direction on how to award loyalty program points or value. The rules engine 102 assesses the loyalty program 101 points based on the transaction information 120 and stores the points in the customer profile database 112. The rules engine 102 may then provide the change in the loyalty program 101 to the loyalty program interface 122. The rules engine 102, in embodiments, sends a change to the loyalty program interface 122 after each change. In other embodiments, the rules engine 102 batches the changes and sends received changes periodically, for example, daily or weekly.

One or more loyalty program participants 110 may access loyalty program information (for example, how many points a loyalty program participant has) from his or her participant display 124. The participant display 124 requires the information from the loyalty program interface 122. The loyalty program interface 122 can then produce a display, for example, a web page, and send the display to the participant display 124 for the loyalty program participant 110. In embodiments, the rendered participant display 124 includes information about two or more loyalty program participants 110. As such, the loyalty program participant 110 can view his or her loyalty points in relation to one or more other loyalty program participants 110.

Figure 2:
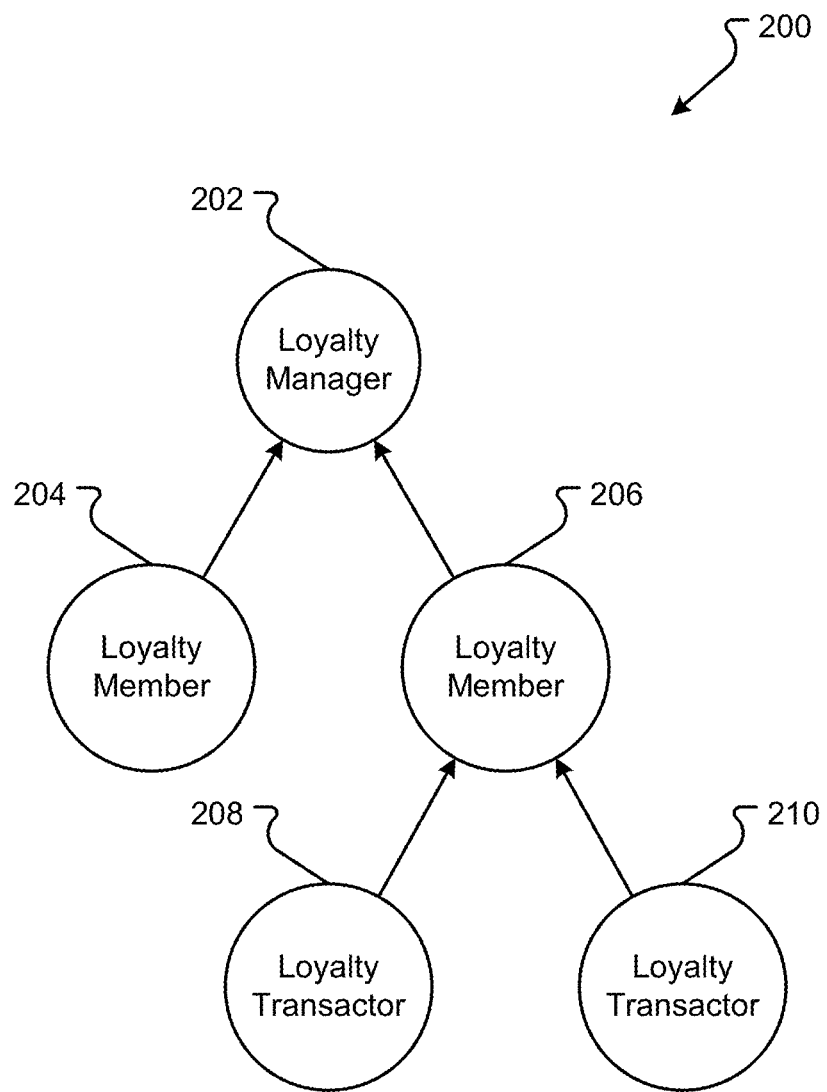
FIG. 2 is a block diagram of an embodiment of a hardware system for managing a loyalty program that allows loyalty competition or insight into participation by two or more loyalty members.

A tree diagram of an organization 200 of a loyalty program 101 (FIG. 1) is shown in FIG. 2. FIG. 2 is only exemplary and is provided to show simply how the loyalty program 101 (FIG. 1) can be organized to involve multiple entities in the loyalty program 101 (FIG. 1). A loyalty manager 202, in embodiments, executes the loyalty program 101 (FIG. 1). As such, the loyalty manager 202 receives loyalty information or transaction information 120 (FIG. 1) from one or more entities. The loyalty manager 202 can be a separate entity that manages the loyalty program 101 (FIG. 1) for a retailer, manufacturer, or other business or organization. In other embodiments, the loyalty manager 202 is the retailer, manufacturer, or other business or organization.

In embodiments, the loyalty manager 202 receives loyalty program information, such as transaction information 120 (FIG. 1) from one or more loyalty members 204 and/or 206. A loyalty member 204 and/or 206 can be any entity that sends loyalty program information to the loyalty manager 202. In embodiments, the loyalty member 204 and/or 206 may transact business with a customer, such as loyalty member 204, and send the transaction information to the loyalty manager 202. In other embodiments, the loyalty member 206 may consolidate transaction information from two or more loyalty transactors 208 and/or 210 that transact business with customers. For example, if the loyalty manager 202 is the retailer, the loyalty member 204 and/or 206 can be a retail store that transacts business with a customer. In another example, if the loyalty manager 202 is a separate entity and the loyalty program 101 (FIG. 1) is for a predetermined retail product (e.g., a brand of soap, a brand of milk, etc.), the loyalty members 204 and/or 206 may be retail chains (e.g., Wal-Mart, Kmart, Safeway, etc.). In this example, the retail chains may receive transaction information 120 (FIG. 1) from one or more retail stores within the retail chain. In embodiments, the retail stores are exemplary loyalty transactors 208 and/or 210 that send transaction information 120 (FIG. 1) to a retail chain functioning as the loyalty member 206. One skilled in the art will recognize other various arrangements of entities that can use the loyalty systems and methods described herein.

Figure 3:
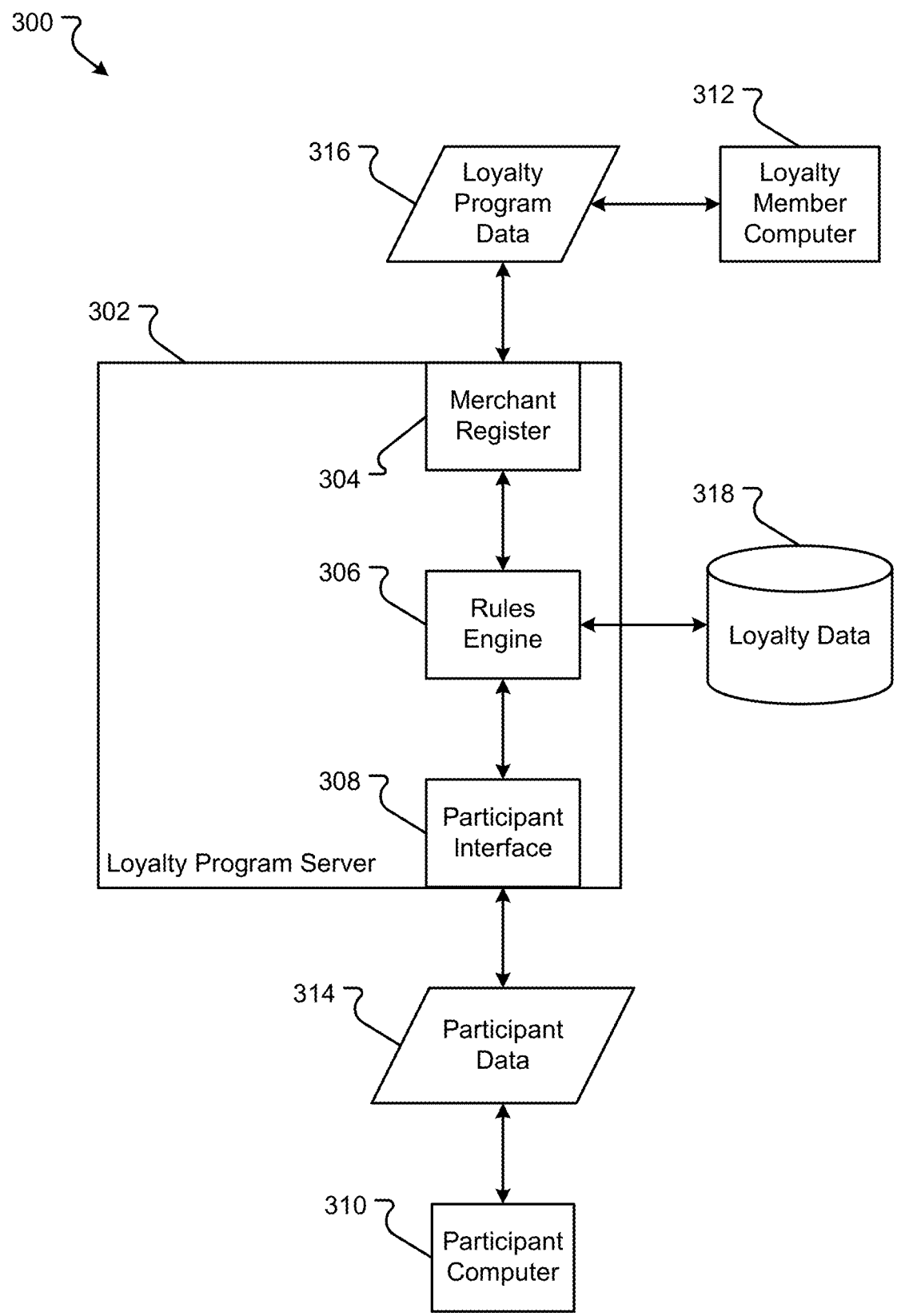
FIG. 3 is a tree diagram of an embodiment of a hierarchy for managing loyalty transactions among two or more organizations.

An embodiment of a hardware system 300 operable to execute the components of the loyalty program system 101 (FIG. 1) is shown in FIG. 3. In embodiments, the hardware system 300 comprises a loyalty program server 302 in communication with a loyalty member computer 312 and/or a participant computer 310. In embodiments, the loyalty program server 302 is one or more computer systems, as described in conjunction with FIG. 9. The loyalty program server 302 can be executed by the loyalty manager 202 (FIG. 2).

In embodiments, the loyalty program server 302 comprises a merchant register component 304, a rules engine component 306, and/or a participant interface 308. The merchant register component 304, a rules engine 306, and/or a participant interface 308 may be hardware, software, or a combination of hardware and software. For example, the merchant register component 304 and/or a participant interface 308 are a router, MODEM, or other hardware device that receives and sends signals over the Internet. In embodiments, the merchant register component 304 and/or a participant interface 308 are operable to execute the program creation component 104 (FIG. 1), the loyalty program interface 122 (FIG. 1), and/or the participant registration component 108 (FIG. 1). In further embodiments, the merchant register component 304 is also operable to receive transaction information 120 (FIG. 1).

The rules engine component 306 may be a processor or other hardware operable to execute the rules engine 102 (FIG. 1). In embodiments, the rules engine component 306 is a processor, such as the Intel® Xeon® 7000 sever processor. Alternatively, the rules engine component 306 can be a customer-made hardware device, such as an application specific integrated circuit (ASIC) or field programmable gate array (FPGA). The rules engine component 306, in embodiments, is in communication with the merchant register component 304 and/or a participant interface 308. The rules engine component 306 can also store or retrieve data from a loyalty data database 318.

In embodiments, the loyalty data database 318 is a storage system, such as a disc array, solid state memory, or other memory or storage. The loyalty data database 318, in embodiments, stores the loyalty program rules database 114 (FIG. 1) and/or customer profile database 112 (FIG. 1). The loyalty data database 318 can be a relational database, flat file, or other type or form of database.

The merchant register component 304 can receive loyalty program data 316 from the loyalty member computer 312. In embodiments, the loyalty member computer 312 is one or more computer systems, as described in conjunction with FIG. 9. The loyalty member computer 312 can be executed or operated by the loyalty member 204 and/or 206 (FIG. 2) or by the loyalty transactor 208 and/or 210 (FIG. 2). In embodiments, the loyalty member computer 312 is operable to act as a program creator 106 (FIG. 1) and send program creation information and rules to the loyalty program server 302. In alternative embodiments, the loyalty member computer 312 is operable to receive purchase information 118 (FIG. 1) and send transaction information 120 (FIG. 1) to the loyalty program server 302. In still further embodiments, the loyalty member computer 312 collects two or more items of purchase information 118 (FIG. 1), from two or more other loyalty member computers 312 operated by loyalty transactors 208 and/or 210 (FIG. 2), consolidate the purchase information 118 (FIG. 1), and send transaction information 120 (FIG. 1) to the loyalty program server 302. In embodiments, loyalty program data 316 includes any of the aforementioned information sent by the loyalty member computer 312 to the loyalty program server 302 or received at the loyalty member computer 312 from the loyalty program server 302.

The merchant register component 304 can send or receive participant data 314 from the participant computer 310. In embodiments, the participant computer 310 is one or more computer systems, as described in conjunction with FIG. 9. The participant computer 310, in embodiments, can be a personal computer, laptop, or other computer operated by the loyalty program participant 110 (FIG. 1) that can include the participant display 124 (FIG. 1). In embodiments, the participant computer 310 is operable to send participant registration information to the participant registration component 108 (FIG. 1) and operable to communicate with the loyalty program interface 122 (FIG. 1). In alternative embodiments, the participant computer 310 is operable to communicate with the loyalty program interface 122 (FIG. 1). In still further embodiments, the participant computer 310 is operable to send program creation information and rules to the program creation component 104 (FIG. 1) to create a loyalty program 101 (FIG. 1). In embodiments, participant data 314 includes any of the aforementioned information sent by the participant computer 310 to the loyalty program server 302 or received at the participant computer 310 from the loyalty program server 302.

Figure 4:
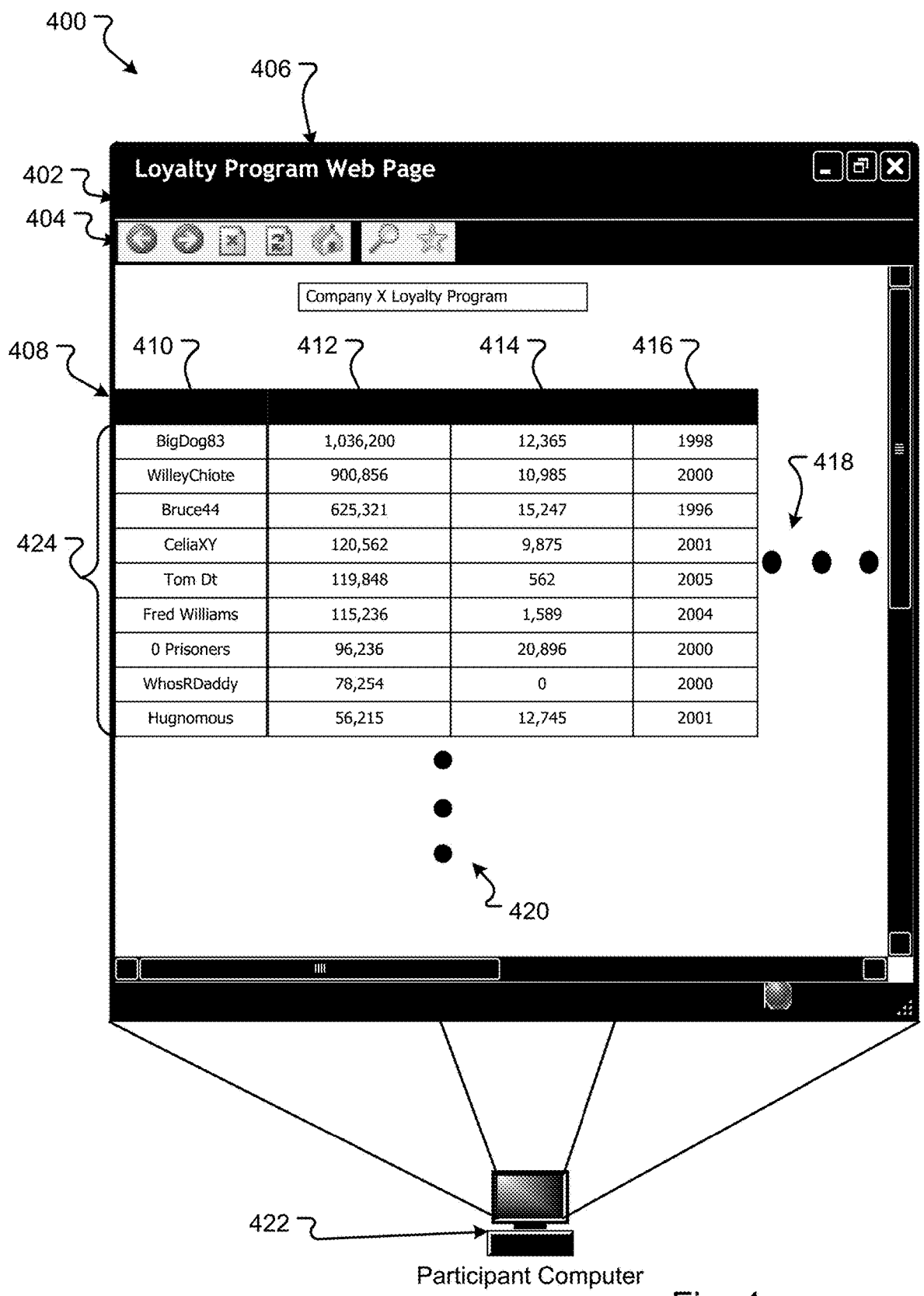
FIG. 4 is a flow diagram of an embodiment of a loyalty points web page shown in a window of a participant computer.

An embodiment of a loyalty points program web page 406 is shown in window 400 of the participant computer 422 of FIG. 4. Participant computer 422 may be the same or similar to participant computer 310 (FIG. 3). The window 400 may include several icons, toolbars, menu bars, menus, etc. For example, window 400 includes menu bar 402 and toolbar 404. Each toolbar 404 and/or menu bar 402 may have selectable icons or devices for accomplishing tasks or executing functions. In embodiments, the participant computer 422 displays a web page 406 for the loyalty program for Company X.

In embodiments, the web page 406 includes information 408 about two or more loyalty program participant 410, which may be the same or similar to the loyalty program participant 110 (FIG. 1), the lifetime loyalty points 412 earned by the loyalty program participant 410, the loyalty points 414 earned by the loyalty program participant 410 in the current month, and the date 416 the customer became a loyalty program participant 410. The web page 406 may include other information as represented by ellipses 418. In embodiments, the web page 406 includes information 408 about loyalty program participants 424. The web page 406 can include information about more loyalty participants, as represented by ellipses 420. The embodiment of the web page 406 shows that a loyalty program participant 424 can view loyalty data for two or more loyalty program participants 424. In alternative embodiments, the loyalty program participants 410 are selectable and allow a loyalty program participant 424 to communicate with a loyalty program participant 410 by selecting the loyalty program participant's name 410.

Figures 5A, 5B:
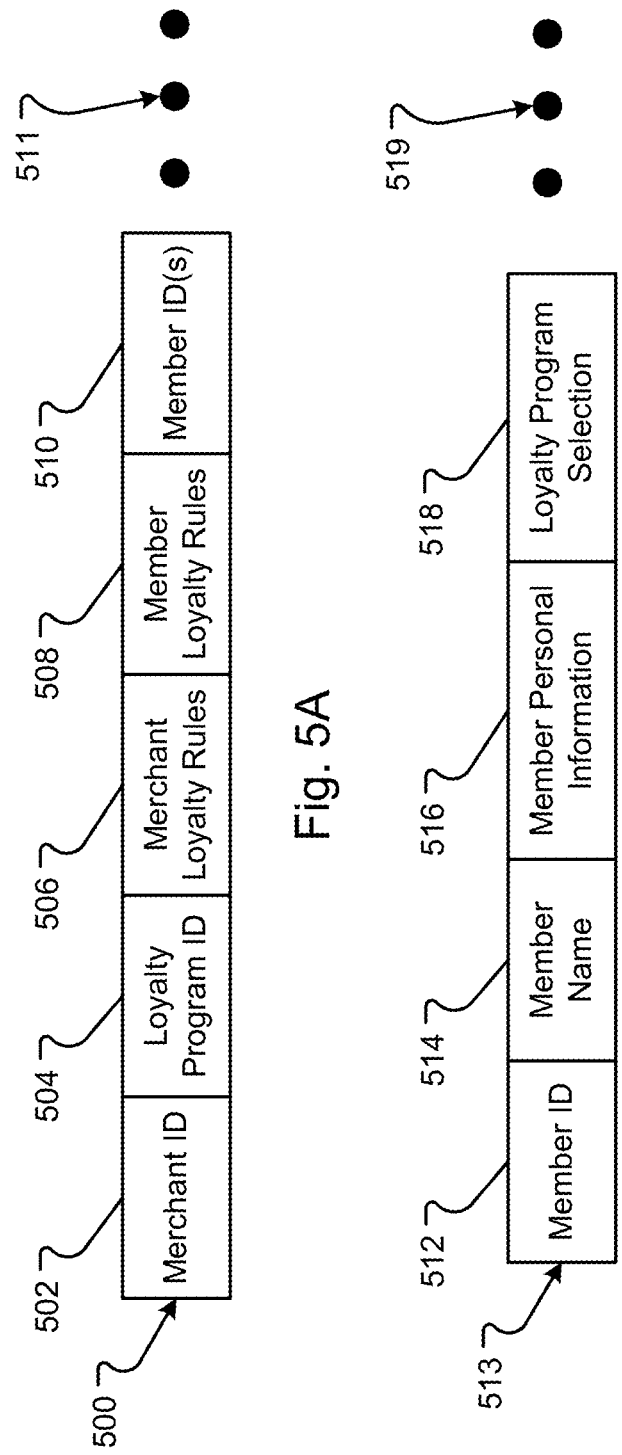
FIGS. 5A and 5B are block diagrams of embodiments of databases for storing loyalty member profiles or rules, customer profiles, and other information about loyalty program competitions.

An embodiment of a loyalty program rules database record 500 is shown in FIG. 5A. In embodiments, loyalty program rules database record 500 is the same or similar to loyalty program rules database 114 (FIG. 1). In embodiments, the loyalty program rules database record 500 includes one or more fields. The fields are operable to allow a computer system, such as the computer system described in conjunction with FIG. 9, to execute a function. The loyalty program rules database 500, in embodiments, comprises a merchant identifier (ID) field 502, a loyalty program ID field 504, a merchant loyalty rules field 506, a member loyalty rules field 508, and/or a members ID field 510. The loyalty program rules database record 500 may have more or less fields than those shown in FIG. 5A, as represented by ellipses 511.

The merchant ID field 502 includes one or more identifiers for the merchant or organization that created or manages the loyalty program 101 (FIG. 1). The merchant identifier 502 can be a number, a name, or other alphanumeric identifier. In embodiments, the merchant ID 502 is a unique object identifier. In alternative embodiments, the merchant ID field 512 includes both an identifier used by the loyalty program server 101 (FIG. 1) or loyalty manager 202 (FIG. 2) to identify the merchant and also a display name (e.g., "Company X," as seen in FIG. 4) used for the loyalty program web page 406 (FIG. 4).

The loyalty program ID field 504 includes one or more identifiers for the loyalty program(s) 101 (FIG. 1) associated with the merchant. The loyalty program ID 504 can be a number, a name, or other alphanumeric identifier. In embodiments, the loyalty program ID 504 is a unique object identifier. Each merchant may have two or more loyalty programs 101 (FIG. 1). As such, the loyalty program ID field 504 may include two or more loyalty program IDs 504 associated with the merchant and the merchant ID 502. For example, a loyalty program created by a loyalty program participant 110 (FIG. 1) under the merchant's loyalty program can be assigned a separate loyalty program ID 504.

The merchant loyalty rules field 506, in embodiments, includes the one or more loyalty program rules for the loyalty program 101 (FIG. 1). The loyalty program rules 506 can be those rules received from the program creation component 104 (FIG. 1). Exemplary rules may include how many points to assign for a predetermined purchase, at what levels rewards are offered, who can join the program, how to apply, etc.

The member loyalty rules field 508 can include the one or more rules for a loyalty participant-created loyalty program. A loyalty program participant 110 (FIG. 1) can create a separate loyalty program under the auspices of the merchant's loyalty program 101 (FIG. 1). For example, a loyalty program participant 110 (FIG. 1) may create the Big Mac® club under the McDonald's® loyalty program 101 (FIG. 1). The Big Mac® club could have a competition for one or more persons and reward points based on which a loyalty program participant 110 (FIG. 1) consumes the most Big Macs® in a month. The rules for the separate program can be stored in the member loyalty rules field 508. Exemplary rules may include how points are assigned, time periods for the program, who can participate in the program, how to register, etc.

In embodiments, the members ID field 510 stores one or more member identifiers for the loyalty program participants 110 (FIG. 1) participating in the merchant loyalty program 101 (FIG. 1) and/or member-created loyalty program. The member identifier 510 can be a number, a name, or other alphanumeric identifier. In embodiments, the member ID 510 is a unique object identifier. In alternative embodiments, the member ID field 510 includes both an identifier used by the loyalty program server 101 (FIG. 1) to identify the loyalty program participant 110 (FIG. 1) (e.g., a loyalty program number) and also a display name (e.g., "Big-Dog83," as seen in FIG. 4) used for the loyalty program web page 406 (FIG. 4).

An embodiment of a customer profiles database 513 is shown in FIG. 5B. In embodiments, customer profiles database 513 is the same or similar to customer profiles database 112 (FIG. 1). In embodiments, the customer profiles database 513 includes one or more fields. The fields are operable to allow a computer system, such as the computer systems described in conjunction with FIG. 9, to execute a function. The customer profiles database 513, in embodiments, comprises a member identifier (ID) field 512, a member name field 514, a member personal information field 516, and/or a loyalty program selection field 518. The customer profiles database 513 may have more or less fields than those shown in FIG. 5B, as represented by ellipses 519.

The members ID field 512, in embodiments, stores one or more member identifier for the loyalty program participants 110 (FIG. 1) participating in the merchant loyalty program 101 (FIG. 1) and/or member-created loyalty program. The members ID 512 is the same or similar to member ID 510 (FIG. 5A). The member identifier 512 can be a number, a name, or other alphanumeric identifier. In embodiments, the member ID 512 is a unique object identifier. In alternative embodiments, the member ID field 512 includes both an identifier used by the loyalty program server 101 (FIG. 1) to identify the loyalty program participant 110 (FIG. 1) (e.g., a loyalty program number) and also a display name (e.g., "BigDog83," as seen in FIG. 4) used for the loyalty program web page 406 (FIG. 4).

The member name field 514 can include the personal name of the loyalty program participant 110 (FIG. 1). For example, the loyalty program participant 110 (FIG. 1) name is John Smith. This name may be included in the member name field 514. In embodiments, the member name field 514 includes both the actual name of the loyalty program participant 110 (FIG. 1) and also a display name (e.g., "Big-Dog83," as seen in FIG. 4) used for the loyalty program web page 406 (FIG. 4).

The member personal information field 516, in embodiments, includes one or more items of personal information for the loyalty program participant 110 (FIG. 1). Personal information 516 may include the loyalty participant's address, phone number, social security number, nickname, email address, computer system, login name, login password, etc. In embodiments, the personal information 516 can be used to provide rewards or recognition to the loyalty program participant 110 (FIG. 1).

The loyalty program selection field 518 includes one or more identifiers for the loyalty program(s) 101 (FIG. 1) for which the loyalty program participant 110 (FIG. 1) selected to participate. The loyalty program selection field 518 can include two or more loyalty program IDs 504 (FIG. 5A). The selected loyalty program IDs 504 (FIG. 5A) for the loyalty program selection field 518 can be received by the participant registration component 108 (FIG. 1) when the loyalty program participant 110 (FIG. 1) registers or sometime thereafter when updating his or her profile.

Figure 6:
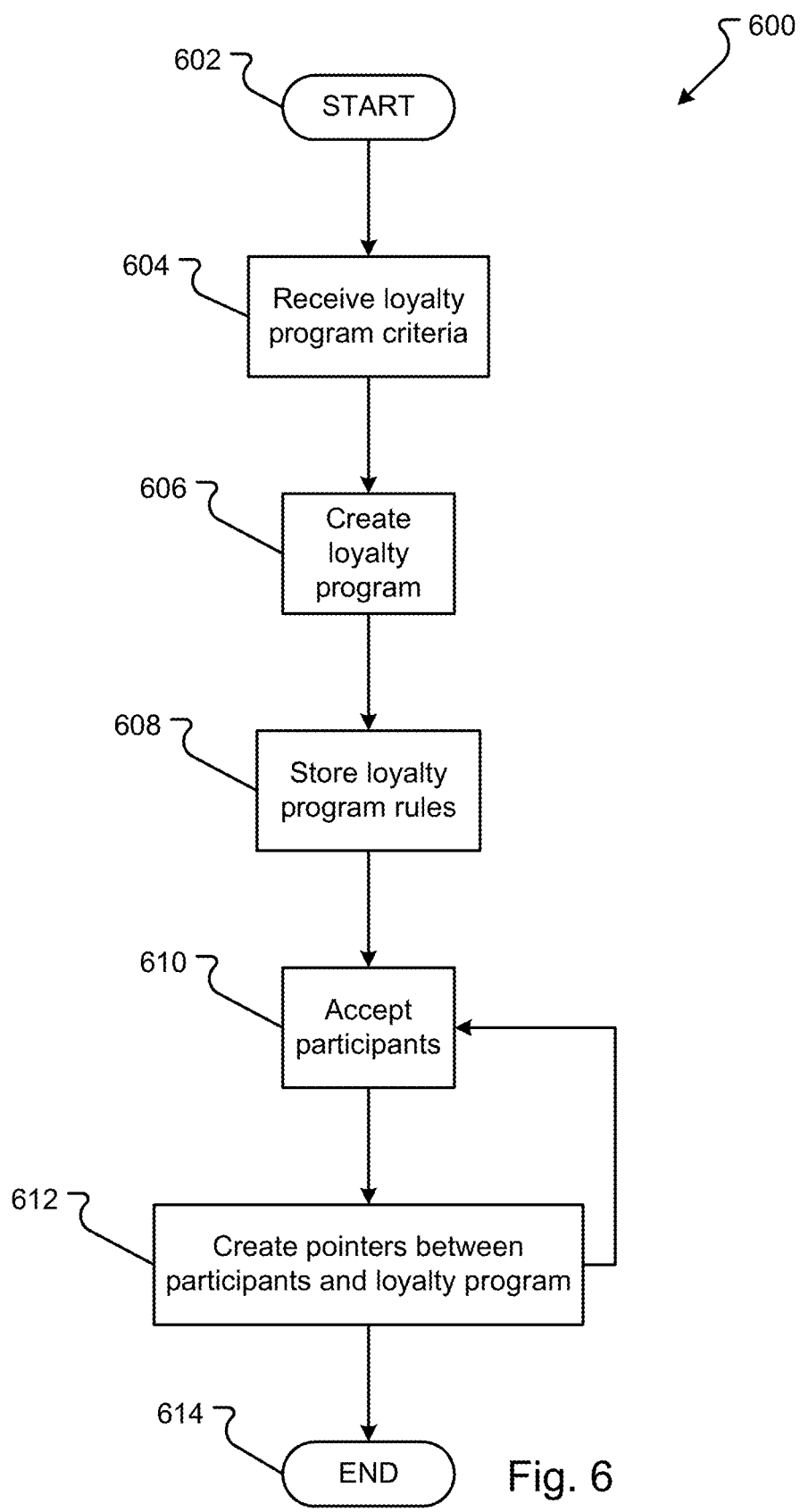

An embodiment of a method 600 for creating a loyalty program 101 (FIG. 1) is shown in FIG. 6. In embodiments, the method 600 generally begins with a START operation 602 and terminates with an END operation 614. The steps shown in the method 600 may be executed in a computer system as a set of computer executable instructions. While a logical order is shown in FIG. 6, the steps shown or described can, in some circumstances, be executed in a different order than presented herein. In embodiments, the loyalty program 101 (FIG. 1) created in FIG. 6 is a loyalty program 101 created by a loyalty program participant 110 (FIG. 1) under the auspices of a merchant or other organization loyalty program 101 (FIG. 1).

Receive operation 604 receives loyalty program criteria. In embodiments, a loyalty manager 202 (FIG. 2) communicates with a loyalty program server 302 (FIG. 3) with a loyalty member computer 312 (FIG. 3). The loyalty manager 202 (FIG. 2) can provide loyalty program data 316 (FIG. 3) to a merchant register 304 (FIG. 3). The merchant register 304 (FIG. 3), in embodiments, executes a program creation component 104 (FIG. 1) that receives the loyalty program criteria.

Create operation 606 creates a loyalty program 101 (FIG. 1). The loyalty program server 302 (FIG. 3), in embodiments, accesses one or more items from a loyalty data database 318 (FIG. 3). In embodiments, the loyalty program server 302 (FIG. 3) executes a rules engine 102 (FIG. 1) that accesses a loyalty program rules database record 500 (FIG. 5A) (which may be the same or similar to loyalty program rules database 114 (FIG. 1)) that may be a portion of the loyalty data database 318 (FIG. 3). The rules engine 102 (FIG. 1) can search for a merchant ID 502 (FIG. 5A) that may exist in the loyalty program rules database record 500 (FIG. 5A). If no merchant ID 502 (FIG. 5A) is found in the loyalty program rules database record 500 (FIG. 5A), the rules engine 102 (FIG. 1), in embodiments, creates a new loyalty program rules database record 500 (FIG. 5A) having merchant ID 502 (FIG. 5A). If a merchant ID 502 (FIG. 5A) is found in the loyalty program rules database record 500 (FIG. 5A), the rules engine 102 (FIG. 1), in embodiments, creates a new loyalty program ID 504 (FIG. 5A) for the loyalty rules database record 500 (FIG. 5A) having the found merchant ID 502 (FIG. 5A).

Store operation 608 stores the loyalty program rules. In embodiments, the loyalty program server 302 (FIG. 3) stores the created new loyalty program rules database record 500 (FIG. 5A) or the edited loyalty program rules database record 500 (FIG. 5A) into the loyalty program rules database record 500 (FIG. 5A). In alternative embodiments, the loyalty program server 302 (FIG. 3) stores only the merchant loyalty rules 506 (FIG. 5) and/or member loyalty rules 508 (FIG. 5A) into the created loyalty program rules database record 500 (FIG. 5A).

Accept operation 610 accepts participants. In embodiments, a loyalty program participant 110 (FIG. 1) communicates participant data 314 (FIG. 3) to a participant interface 308 (FIG. 3) of a loyalty member computer 312 (FIG. 3). In embodiments, the participant interface 308 (FIG. 3) executes the loyalty program interface 122 (FIG. 1) that communicates with the participant display 124 (FIG. 1) of the participant computer 310 (FIG. 3). In embodiments, the participant data 314 (FIG. 3) includes a selection of one or more loyalty programs. The loyalty program participant 110 (FIG. 1) may select the one or more loyalty programs 101 (FIG. 1) by a loyalty program ID 504 (FIG. 5A), which is displayed on the participant display 124 (FIG. 1) of the participant computer 310 (FIG. 3). The selections are sent to the rules engine component 102 (FIG. 1) executed by the rules engine 306 (FIG. 3).

Create operation 612 creates pointers between the loyalty program participant 110 (FIG. 1) and the loyalty programs 101 (FIG. 1) selected. In embodiments, the rules engine component 102 (FIG. 1) changes the customer profile record 513 (FIG. 5B) by adding one or more loyalty program IDs 504 (FIG. 5A), associated with the selected loyalty programs 101 (FIG. 1), into the loyalty program selection field 518 (FIG. 5B). In alternative embodiments, the rules engine component 102 (FIG. 1) changes the loyalty program rules record 500 (FIG. 5A) by adding one or more member IDs 512 (FIG. 5B), associated with the loyalty program participant 110 (FIG. 1), into the member IDs field 510 (FIG. 5A). These changes to the loyalty program rules record 500 (FIG. 5A) and customer profile record 513 (FIG. 5B) creates pointers between the loyalty programs 101 (FIG. 1) and the loyalty programs' participants 110 (FIG. 1). In embodiments, the rules engine component 102 (FIG. 1) can return to accept operation 610 to accept one or more other participants or may proceed to end operation 614.

Figure 7:
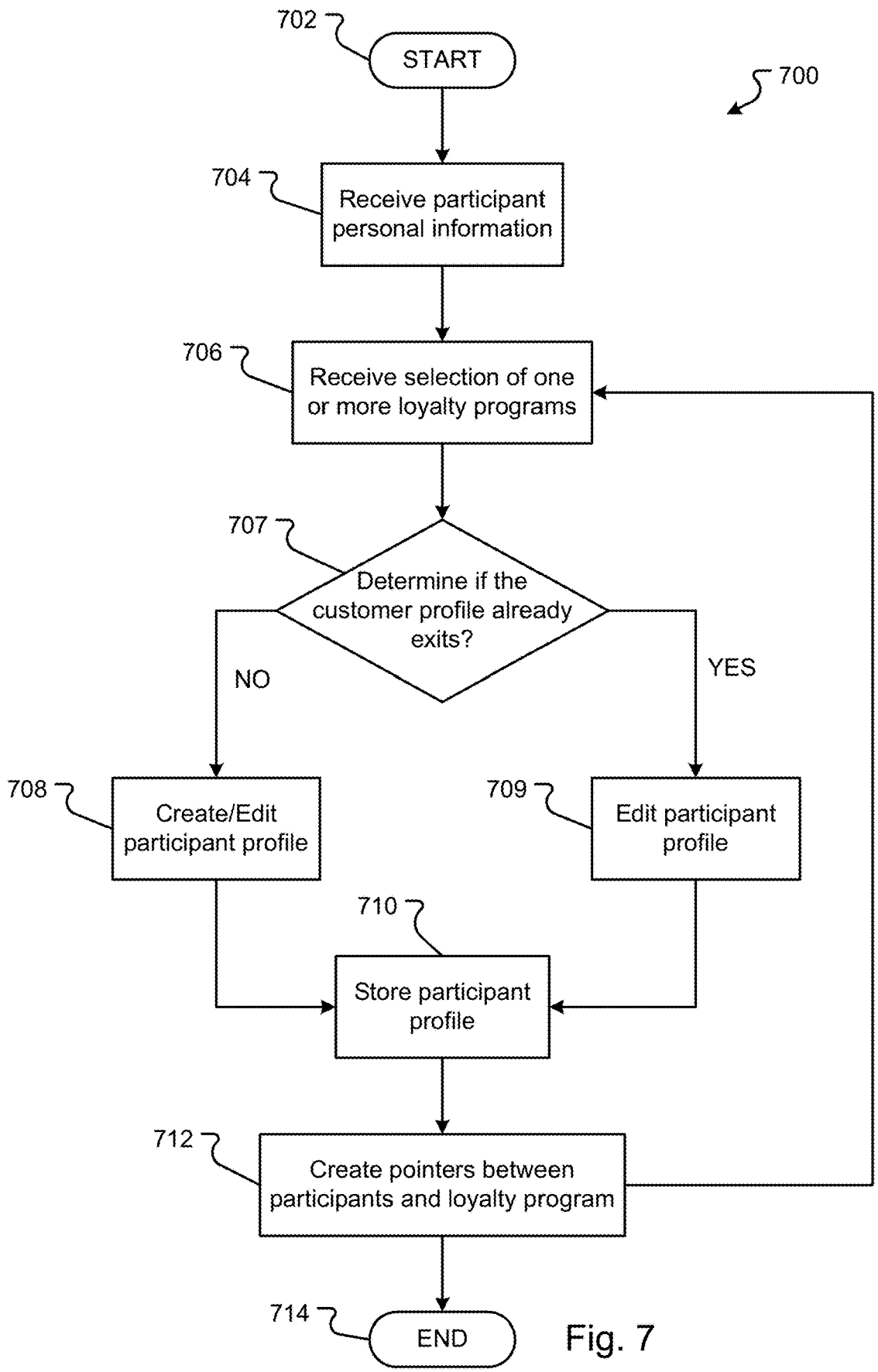
FIG. 7 is a flow diagram of an embodiment of a method for managing loyalty programs that allows loyalty competition or insight into participation by two or more loyalty members.

An embodiment of a method 700 for registering one or more loyalty program participants 110 (FIG. 1) is shown in FIG. 7. In embodiments, the method 700 generally begins with a START operation 702 and terminates with an END operation 714. The steps shown in the method 700 may be executed in a computer system as a set of computer executable instructions. While a logical order is shown in FIG. 7, the steps shown or described can, in some circumstances, be executed in a different order than presented herein.

Receive operation 704 receives participant personal information. In embodiments, a loyalty program participant 110 (FIG. 1) communicates with a loyalty program server 302 (FIG. 3) with a participant computer 310 (FIG. 3). The loyalty program participant 110 (FIG. 1) can provide participant data 314 (FIG. 3) to a participant interface 308 (FIG. 3). The participant interface 308 (FIG. 3), in embodiments, executes a participant registration component 108 (FIG. 1) that receives the participant data 314 (FIG. 3).

Receive operation 706 receives a selection of one or more loyalty programs. In embodiments, a loyalty program participant 110 (FIG. 1) communicates participant data 314 (FIG. 3) to a participant interface 308 (FIG. 3) of a loyalty member computer 312 (FIG. 3). In embodiments, the participant interface 308 (FIG. 3) executes the loyalty program interface 122 (FIG. 1) that communicates with the participant display 124 (FIG. 1) of the participant computer 310 (FIG. 3). In embodiments, the participant data 314 (FIG. 3) includes a selection of one or more loyalty programs 101 (FIG. 1). The loyalty program participant 110 (FIG. 1) may select the one or more loyalty programs 101 (FIG. 1) by a loyalty program ID 504 (FIG. 5A), which is displayed on the participant display 124 (FIG. 1) of the participant computer 310 (FIG. 3). The selections are sent to the rules engine component 102 (FIG. 1) executed by the rules engine 306 (FIG. 3).

Determine operation 707 determines if the participant profile already exists. The loyalty program server 302 (FIG. 3), in embodiments, accesses one or more items from a loyalty data database 318 (FIG. 3). In embodiments, the loyalty program server 302 (FIG. 3) executes a rules engine 102 (FIG. 1) that accesses a customer profiles database 513 (FIG. 5B), which may be the same or similar to customer profile database 112 (FIG. 1)) and which may be a portion of the loyalty data database 318 (FIG. 3). The rules engine 102 (FIG. 1) can search for a member ID 512 (FIG. 5B) or member personal information 516 (FIG. 5B) that may exist in the customer profiles database 513 (FIG. 5B). If no member ID 512 (FIG. 5B) or matching member personal information 516 (FIG. 5B) is found in the customer profiles database 513 (FIG. 5B), the process flows NO to create operation 708. If a member ID 512 (FIG. 5B) or matching member personal information 516 (FIG. 5B) is found in the customer profiles database 513 (FIG. 5B), the process flows YES to edit operation 709.

Create operation 708 creates a participant profile. In embodiments, the rules engine 102 (FIG. 1), executed by the loyalty program server 302 (FIG. 3), creates a new customer profiles record 513 (FIG. 5B) (in the loyalty data database 318 (FIG. 3)) having a new member ID 512 (FIG. 5).

Edit operation 709 edits the customer profiles database 513 (FIG. 5B). The rules engine 102 (FIG. 1), executed by the loyalty program server 302 (FIG. 3), in embodiments, edits the existing customer profile database record 513 (FIG. 5B) (in the loyalty data database 318 (FIG. 3)) having the existing member ID 512 (FIG. 5B).

Store operation 710 stores the participant data. In embodiments, the loyalty program server 302 (FIG. 3) stores the created or edited customer profile database record 513 (FIG. 5B) into the customer profile database 112 (FIG. 1). In alternative embodiments, the loyalty program server 302 (FIG. 3) stores only the changes to the customer profiles database 513 (FIG. 5B) into the edited customer profile database 112 (FIG. 1).

Create operation 708 creates pointers between the loyalty program participant 110 (FIG. 1) and the loyalty programs 101 (FIG. 1) selected. In embodiments, the rules engine component 102 (FIG. 1) changes the customer profile record 513 (FIG. 5B) by adding one or more loyalty program IDs 504 (FIG. 5A), associated with the selected loyalty programs 101 (FIG. 1), into the loyalty program selection field 518 (FIG. 5B). In alternative embodiments, the rules engine component 102 (FIG. 1) changes the loyalty program rules record 500 (FIG. 5A) by adding one or more member IDs 512 (FIG. 5B), associated with the loyalty program participant 110 (FIG. 1), into the member IDs field 510 (FIG. 5B). These changes to the loyalty program rules record 500 (FIG. 5A) and customer profiles database record 513 (FIG. 5B) creates pointers between the loyalty programs 101 (FIG. 1) and the loyalty programs' participants 110 (FIG. 1). In embodiments, the rules engine component 102 (FIG. 1) can return to receive operation 706 to receive a selection from one or more other loyalty program participants 110 (FIG. 1) or may proceed to end operation 714.

Figure 8:
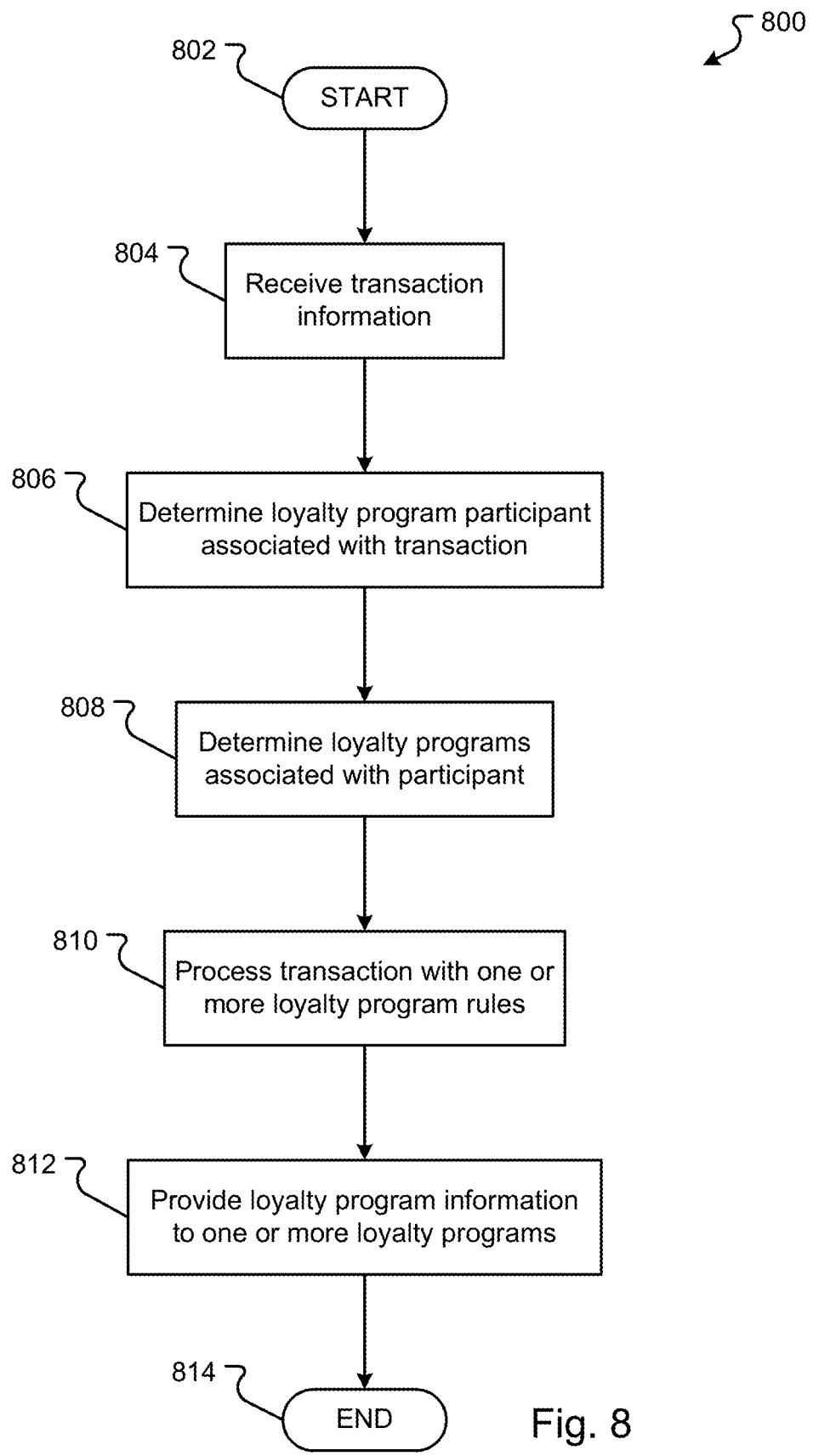
FIG. 8 is a block diagram of an embodiment of a computer system operable to manage a loyalty program that allows loyalty competition or insight into participation by two or more loyalty members.

An embodiment of a method 800 for conducting a loyalty program 101 (FIG. 1) is shown in FIG. 8. In embodiments, the method 800 generally begins with a START operation 802 and terminates with an END operation 814. The steps shown in the method 800 may be executed in a computer system as a set of computer executable instructions. While a logical order is shown in FIG. 8, the steps shown or described can, in some circumstances, be executed in a different order than presented herein.

Receive operation 804 receives transaction information 120 (FIG. 1). In embodiments, a loyalty manager 202 (FIG. 2) executing the loyalty program server 302 (FIG. 3) receives transaction information 120 (FIG. 1) or purchase information 118 (FIG. 1) from one or more loyalty members 204 and/or 206 (FIG. 2). The loyalty program server 302 receives the transaction information 120 (FIG. 1) at a merchant register 304 (FIG. 3).

Determine operation 806 determines the loyalty program participant(s) 110 (FIG. 1) associated with the transaction information. The loyalty program server 302 (FIG. 3), in embodiments, searches the transaction information 120 (FIG. 1) for one or more member IDs 512 (FIG. 5B). In embodiments, the rules engine 102 (FIG. 1) parses the transaction information 120 (FIG. 1) and locates one or more member IDs 512 (FIG. 5B).

Determine operation 808 determines loyalty programs associated with the loyalty participant. In embodiments, the rules engine 102 (FIG. 1) first determines the participant profile associated with the one or more member IDs 512 (FIG. 5B). The loyalty program server 302 (FIG. 3), in embodiments, accesses one or more items from a loyalty data database 318 (FIG. 3). In embodiments, the loyalty program server 302 (FIG. 3) executes a rules engine 102 (FIG. 1) that searches a customer profiles database 513 (FIG. 5B) (which may be the same or similar to customer profile database 112 (FIG. 1)) that may be a portion of the loyalty data database 318 (FIG. 3). The rules engine 102 (FIG. 1) can search for the member ID(s) 512 (FIG. 5B) in the customer profiles database 513 (FIG. 5B). The rules engine 102 (FIG. 1) retrieves the one or more customer profile records 513 (FIG. 5B) associated with the found member ID(s) 512 (FIG. 5). The rules engine 102 (FIG. 1) may then search for loyalty program IDs in the loyalty program selection field 518 (FIG. 5B) to determine the loyalty programs associated with the participant.

Process operation 810 processes the transaction information 120 (FIG. 1) with one or more loyalty program rules. In embodiments, the rules engine 102 (FIG. 1) determines the one or more loyalty program IDs 504 (FIG. 5A) in each of the retrieved customer profile records 513 (FIG. 5B). The loyalty program IDs 504 (FIG. 5A) function as a pointer to the one or more loyalty program rules records 500 (FIG. 5A) having the same loyalty program IDs 504 (FIG. 5A). The associated loyalty program rules records 500 (FIG. 5A) are then retrieved. The one or more merchant loyalty rules 506 (FIG. 5A) in the associated loyalty program rules records 500 (FIG. 5A) are retrieved. The rules engine 102 (FIG. 1) can then process the transaction information 120 (FIG. 1) with the one or more merchant loyalty rules 506 (FIG. 5A). In embodiments, the rules engine 102 (FIG. 1) assesses points or loyalty program value for each loyalty program participant 110 (FIG. 1). The points or value are then saved in the each of the determined customer profile records 513 (FIG. 5B). In embodiments, if the loyalty program is a loyalty-participant sub-program, the rules engine 102 (FIG. 1) can process the transaction with the member loyalty rules 508 (FIG. 5A)

Provide operation 812 provides the loyalty program information to one or more loyalty program participants 110 (FIG. 1). In embodiments, a request is received from a participant display 124 (FIG. 1) for information about the loyalty program 101 (FIG. 1). The loyalty program interface 122 (FIG. 1) receives the request and forwards the request to the rules engine 102 (FIG. 1). The rules engine 102 (FIG. 1), in embodiments, accesses the customer profile database 112 (FIG. 1) and/or the loyalty program rules database 114 (FIG. 1) to fulfill the request. The information extracted from the customer profile database 112 (FIG. 1) and/or the loyalty program rules database 114 (FIG. 1) can be sent, by the rules engine 102 (FIG. 1), to the rules engine 102 (FIG. 1). In embodiments, the rules engine 102 (FIG. 1) forms a web page 406 (FIG. 4) and sends the web page 406 (FIG. 4) to the participant display 124 (FIG. 1), which renders the web page 406 (FIG. 4). The web page 406 (FIG. 4) may include participant data 314 (FIG. 3) for two or more loyalty program participants 110 (FIG. 1). For example, the web page 406 (FIG. 4) includes the status of two or more loyalty participants 424 (FIG. 4).

Figure 9:
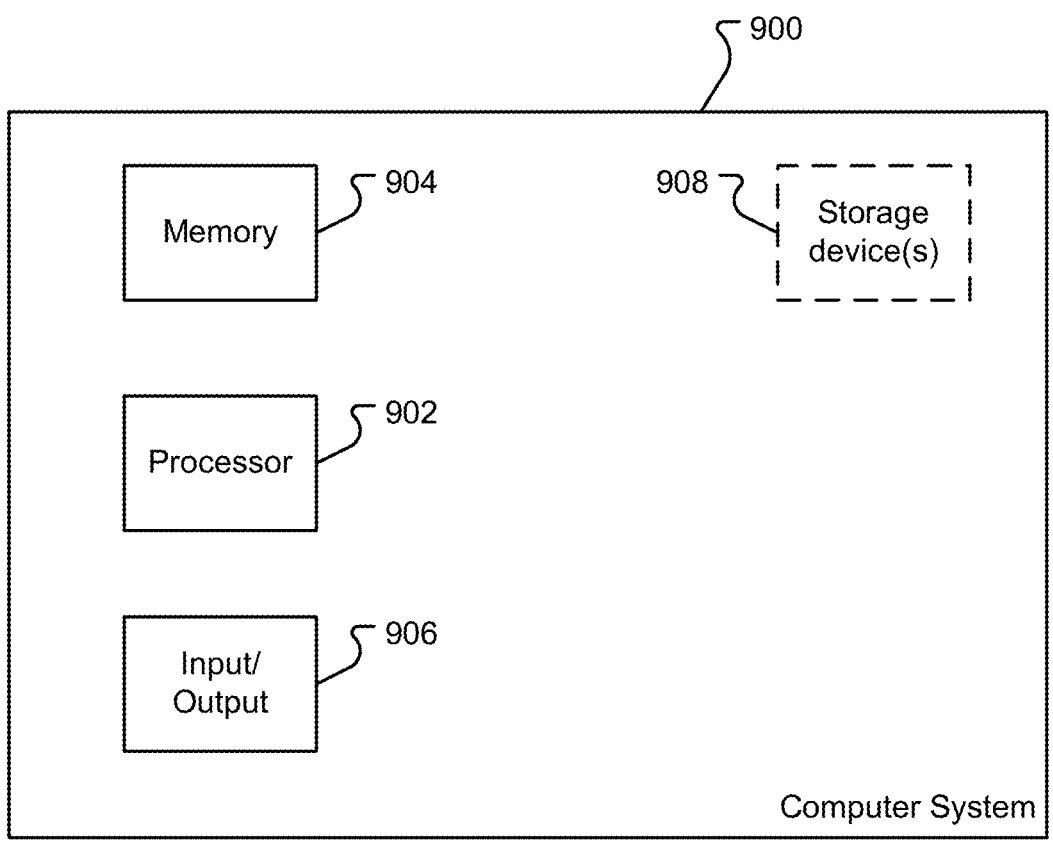
FIG. 9 is a block diagram of a computer system according to embodiments.

An embodiment of a computer system 900 operable to function as one or more components or systems described herein, such as the rules engine 102 (FIG. 1) is shown in FIG. 9. In embodiments, the computer system 900 comprises a processor 902 for executing one or more instructions in software stored on computer-readable medium, such as memory 904 or storage device(s) 908. The instructions may perform a method, such as methods described in conjunction with FIGS. 6, 7, and 8. The computer system, in embodiments, also includes Input/Output (I/O) devices or components 906. The I/O components 906 can include network interface cards, routers, hardware for communicating with peripherals (e.g., printers, monitors, etc.), software drivers, or any other hardware or software needed to receive or send information as described herein.

The computer system 900 can also comprise software elements, shown as being currently located within the working memory 904, including an operating system and/or other code, such as one or more application programs, which may comprise computer programs as described herein, and/or may be designed to implement methods and/or configure systems, as described herein. Merely by way of example, one or more procedures described with respect to the method(s) discussed above might be implemented as code and/or instructions executable by a computer (and/or a processor within a computer).

A set of these instructions and/or code might be stored on a computer-readable storage medium, such as the storage device(s) 908 described above. In some cases, the storage medium might be incorporated within a computer system, such as the database 318 (FIG. 3). In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below, and while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Specific details are given in the above description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. A computing system may be used to execute any of the tasks or operations described herein. In embodiments, a computing system includes memory and a processor and is operable to execute computer-executable instructions stored on a computer-readable medium that define processes or operations described herein.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as a storage medium. A processor(s) 900 may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

In light of the above description, a number of advantages of the present invention are readily apparent. For example, the loyalty program system 101 (FIG. 1) provides information on two or more loyalty program participants 110 (FIG. 1). This information can create a sense of competition that motivates loyalty program participants 110 (FIG. 1) to participant in the loyalty program 101 (FIG. 1) more faithfully. Another advantage is the ability for loyalty program participants 110 (FIG. 1) to create their own loyalty programs 101 (FIG. 1) or challenges, which further enhances program participation.

A number of variations and modifications of the invention can also be used. For example, with contact information stored by the loyalty program system 101 (FIG. 1). Any loyalty program participant 110 (FIG. 1) can communicate with another loyalty program participant 110 (FIG. 1) in a confidential and anonymous manner. For example, a loyalty program participant 110 (FIG. 1) can select a loyalty customer name in the loyalty customer field 410 (FIG. 4) in a web page 406 (FIG. 4). The loyalty program interface 122 (FIG. 1) can receive the selection and send the request to the rules engine 102 (FIG. 1). The rules engine 102 (FIG. 1), in embodiments, accesses the customer profile database 112 (FIG. 1) to find the member ID 512 (FIG. 5B) associated with the selection. Upon finding the member ID 512 (FIG. 5B), the rules engine 102 (FIG. 1) can extract the email, instant messaging, or other information in the member personal information 516 (FIG. 5B). The loyalty program interface 122 (FIG. 1) can then use this information to open a messaging interaction or start an email program. In other embodiments, the loyalty program interface 122 (FIG. 1) sends the information to the participant display 124 (FIG. 1). If the loyalty program interface 122 (FIG. 1) completes the communication, the session can be anonymous.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

While the principles of the invention have been described above in connection with specific apparatuses and methods, it is to be clearly understood that this description is made only by way of example and not as limitation on the scope of the invention.

What is claimed is:

1. A method that is implemented by a computer system having a memory and a processor for adding a sub-program to a loyalty program, the method comprising:
    receiving, using a network interface of the computer system, from one of a plurality of participants of an existing loyalty program, a request to create a loyalty sub-program under the existing loyalty program, wherein:
        the loyalty sub-program includes a challenge to other loyalty program participants of the existing loyalty program to increase a respective individual achievement level;
        the loyalty sub-program is associated with a unique merchant ID of one of a plurality of merchants in communication with the computer system; and
        the one of the plurality of merchants is associated with the loyalty program and the loyalty sub-program;
    creating, using the processor of the computer system, the loyalty sub-program under the existing loyalty program;
    associating the loyalty sub-program with a loyalty program ID;
    storing rules of the loyalty sub-program in a database;
    automatically transmitting, using the network interface, an alert to a remote program administrator device associated with the merchant associated with the loyalty program and the sub-program that the loyalty sub-program has been created; and
    receiving, using the network interface, an approval of the creation the sub-program from the remote program administrator device associated with the merchant participating in the loyalty program and the sub-program based on the alert.

2. The method as described in claim 1, further comprising:
    receiving participant data from one or more users;
    registering the one or more users as participants of the loyalty sub-program; and
    associating the loyalty program ID with a unique member ID of each of the participants of the loyalty sub-program.

3. The method as described in claim 2, further comprising:
    transmitting, using the network interface, a command that causes a remote participant device to display progress of at least two of the participants of the loyalty sub-program.

4. The method as described in claim 2, wherein:
    transmitting a web page that causes a remote device to display loyalty sub-program information for at least two of the participants of the loyalty sub-program.

5. The method as described in claim 2, wherein:
    registering the one or more users as participants of the loyalty sub-program comprises determining that the participant data from at least one of the one or more users is associated with an existing participant profile; and
    associating the loyalty program ID with a unique member ID of each of the participants of the loyalty sub-program is performed based on the determination.

6. The method as described in claim 2, wherein:
    registering the one or more users as participants of the loyalty sub-program comprises determining that the participant data from at least one of the one or more users is not associated with an existing participant profile; and
    creating a participant profile associated with the participant data from at least one of the one or more users based on the determination.

7. The method as described in claim 1, further comprising:
    receiving a communication from a first participant device, the communication comprising an identifier associated with a second participant device; and
    transmitting the communication to the second participant device to establish a communication session between the first participant device and the second participant device.

8. The method as described in claim 1, further comprising:
    transmitting the rules of the loyalty sub-program to the remote program administrator device prior to receiving the approval of the creation the sub-program from the remote program administrator device.

9. The method as described in claim 1, further comprising:
    receiving a communication from a first participant device; and transmitting the communication to a second participant device instructions for determining the loyalty sub-program associated with the one or more loyalty program participants.

10. The method as described in claim 1, wherein:
the challenge comprises competing according to the rules of the loyalty sub-program.

11. The method as described in claim 1, wherein:
creating the loyalty sub-program comprises:
receiving loyalty sub-program criteria from a remote computing device;
receiving the rules of the loyalty sub-program; and
associating the loyalty program ID with the merchant ID.

12. A computer system for adding a loyalty sub-program to a loyalty program, the system comprising:
a network interface,
one or more memories storing computer-executable instructions;
one or more processors configured to access the one or more memories and execute the computer-executable instructions to:
receive, using the network, from one of a plurality of participants of an existing loyalty program, a request to create a loyalty sub-program under the existing loyalty program, wherein:
the loyalty sub-program includes a challenge to other loyalty program participants of the existing loyalty program to increase a respective individual achievement level;
the loyalty sub-program is associated with a unique merchant ID of one of a plurality of merchants in communication with the computer system; and
the one of the plurality of merchants is associated with the loyalty program and the loyalty sub-program;
create the loyalty sub-program under the existing loyalty program;
associate the loyalty sub-program with a loyalty program ID;
store rules of the loyalty sub-program in a database;
automatically alert, using the network interface, a remote program administrator device associated with the merchant participating in the loyalty program and the sub-program that the loyalty sub-program has been created; and
receive, using the network interface, an approval of the creation the sub-program from the remote program administrator device associated with the merchant participating in the loyalty program and the sub-program based on the alert.

13. The computer system for adding a loyalty sub-program to a loyalty program as described in claim 12, wherein the one or more processors are further configured to execute the computer-executable instructions to:
receive participant data from one or more users; and
register the one or more users as participants of the loyalty sub-program and associating the loyalty program ID with a unique member ID of each of the participants of the loyalty sub-program.

14. The computer system for adding a loyalty sub-program to a loyalty program as described in claim 13, wherein the one or more processors are further configured to execute the computer-executable instructions to:
transmit, using the network interface, a command that causes a remote participant device to display progress of at least two of the participants of the loyalty sub-program.

15. The computer system for adding a loyalty sub-program to a loyalty program as described in claim 13, wherein the one or more processors are further configured to execute the computer-executable instructions to:
transmit a web page that causes a remote device to display loyalty program information for at least two of the participants of the loyalty sub-program.

16. The computer system for adding a loyalty sub-program to a loyalty program as described in claim 13, wherein:
registering the one or more users as participants of the loyalty sub-program comprises determining that the participant data from at least one of the one or more users is associated with an existing participant profile; and
associating the loyalty program ID with a unique member ID of each of the participants of the loyalty sub-program is performed based on the determination.

17. The computer system for adding a loyalty sub-program to a loyalty program as described in claim 13, wherein:
registering the one or more users as participants of the loyalty sub-program comprises determining that the participant data from at least one of the one or more users is not associated with an existing participant profile; and
creating a participant profile associated with the participant data from at least one of the one or more users based on the determination.

18. The computer system for adding a loyalty sub-program to a loyalty program as described in claim 12, wherein the one or more processors are further configured to execute the computer-executable instructions to:
receive a communication from a first participant device, the communication comprising an identifier associated with a second participant device; and
transmit the communication to the second participant device to establish a communication session between the first participant device and the second participant device.

19. The computer system for adding a loyalty sub-program to a loyalty program as described in claim 12, wherein the one or more processors are further configured to execute the computer-executable instructions to:
transmit the rules of the loyalty sub-program to the remote program administrator device prior to receiving the approval of the creation the sub-program from the remote program administrator device.

20. The computer system for adding a loyalty sub-program to a loyalty program as described in claim 12, wherein the one or more processors are further configured to execute the computer-executable instructions to:
receive a communication from a first participant device; and
transmit the communication to a second participant device instructions for determining the loyalty sub-program associated with the one or more loyalty program participants.

21. The computer system for adding a loyalty sub-program to a loyalty program as described in claim 12, wherein:
the challenge comprises competing according to the rules of the loyalty sub-program.

22. The computer system for adding a loyalty sub-program to a loyalty program as described in claim 12, wherein:
creating the loyalty sub-program comprises:

receiving loyalty sub-program criteria from a remote computing device;

receiving the rules of the loyalty sub-program; and associating the loyalty program ID with the merchant ID.

23. A non-transitory computer-readable medium having stored thereon one or more instructions for a method that when executed executable by a computer system cause the computer system to:

receive, using a network interface of the computer system, from one of a plurality of participants of an existing loyalty program, a request to create a loyalty sub-program under the existing loyalty program, wherein:

the loyalty sub-program includes a challenge to other loyalty program participants of the existing loyalty program to increase a respective individual achievement level;

the loyalty sub-program is associated with a unique merchant ID of one of a plurality of merchants in communication with the computer system; and the one of the plurality of merchants is associated with the loyalty program and the loyalty sub-program;

create the loyalty sub-program under the existing loyalty program;

associate the loyalty sub-program with a loyalty program ID;

store rules of the loyalty sub-program in a database;

automatically alert a remote program administrator device associated with the merchant participating in the loyalty program and the sub-program that the loyalty sub-program has been created; and receive an approval of the creation the sub-program from the remote program administrator device associated with the merchant participating in the loyalty program and the sub-program based on the alert.

24. The non-transitory computer-readable medium as defined in claim 23, wherein the instructions, when executed, further cause the computing system to:

receive participant data from one or more users; and register the one or more users as participants of the loyalty sub-program and associating the loyalty program ID with a unique member ID of each of the participants of the loyalty sub-program.

25. The non-transitory computer-readable medium as defined in claim 24, wherein the instructions, when executed, further cause the computing system to:

transmit, using the network interface, a command that causes a remote participant device to display progress of at least two of the participants of the loyalty sub-program.

26. The non-transitory computer-readable medium as defined in claim 24, wherein the instructions, when executed, further cause the computing system to:

transmit a web page that causes a remote device to display loyalty program information for at least two of the participants of the loyalty sub-program.

27. The non-transitory computer-readable medium as defined in claim 24, wherein:

registering the one or more users as participants of the loyalty sub-program comprises determining that the participant data from at least one of the one or more users is associated with an existing participant profile; and associating the loyalty program ID with a unique member ID of each of the participants of the loyalty sub-program is performed based on the determination.

28. The non-transitory computer-readable medium as defined in claim 24, wherein:

registering the one or more users as participants of the loyalty sub-program comprises determining that the participant data from at least one of the one or more users is not associated with an existing participant profile; and creating a participant profile associated with the participant data from at least one of the one or more users based on the determination.

29. The non-transitory computer-readable medium as defined in claim 23, wherein the instructions, when executed, further cause the computing system to:

receive a communication from a first participant display device, the communication comprising an identifier associated with a second participant display device; and transmit the communication to the second participant display device to establish a communication session between the first participant display device and the second participant display device.

30. The non-transitory computer-readable medium as defined in claim 23, wherein the instructions, when executed, further cause the computing system to:

transmit the rules of the loyalty sub-program to the remote program administrator device prior to receiving the approval of the creation the sub-program from the remote program administrator device.

\* \* \* \* \*